U nited States Patent [19]

Hofmann

[11] 4,231,984
[45] Nov. 4, 1980

[54] PROCESS FOR THE PRODUCTION OF MOLDED PHOSPHATE BONDED REFRACTORY ARTICLES

[75] Inventor: Franz Hofmann, Neuhausen, Switzerland

[73] Assignee: Georg Fischer Aktiengesellschaft, Switzerland

[21] Appl. No.: 892,020

[22] Filed: Mar. 31, 1978

[30] Foreign Application Priority Data

Apr. 15, 1977 [CH] Switzerland .......................... 4695/77

[51] Int. Cl.$^2$ .............................................. B28B 1/16
[52] U.S. Cl. ...................................... 264/256; 106/65; 106/67; 264/60; 264/65; 264/257; 264/258
[58] Field of Search ...................... 106/65, 67; 264/60, 264/56, 65, 66, 256, 257, 258

[56] References Cited

U.S. PATENT DOCUMENTS

| 2,266,646 | 12/1941 | Lower | 264/60 |
| 3,131,073 | 4/1964 | Long | 264/63 |
| 3,382,082 | 5/1968 | Eubanks et al. | 106/67 |
| 3,427,174 | 2/1969 | Miller | 264/63 |
| 3,832,193 | 8/1974 | Parsons et al. | 106/67 |
| 3,888,687 | 6/1975 | Manigault | 106/67 |

FOREIGN PATENT DOCUMENTS

| 2446820 | 4/1977 | Fed. Rep. of Germany | 264/65 |
| 500144 | 1/1971 | Switzerland | 264/65 |

Primary Examiner—Donald J. Arnold
Attorney, Agent, or Firm—Roylance, Abrams, Berdo & Farley

[57] ABSTRACT

There is disclosed a process for applying a refractory filler and a hydrate of $Al(H_2PO_4)_3$ or polyphosphates as a binder to a single or multi-layered carrier material to form a single or multi-layered, thin-walled structure subsequently hardened on the carrier material. The hardening is preferably conducted at a temperature below 400° C. There is thus obtained a phosphate-bonded, thin-walled shaped article which is refractory at temperatures above 1300° C.

13 Claims, No Drawings

PROCESS FOR THE PRODUCTION OF MOLDED PHOSPHATE BONDED REFRACTORY ARTICLES

This invention relates to a process for the production of a phosphate bonded molded article which is refractory at temperatures above 1300° C. This invention also relates to products obtained in accordance with such a process and to their use in the foundry industry.

It is known in the art to produce refractory molded articles from clay-bonded calcinated fireclay (chamotte) which, when molded into the desired shape, will give a high cold crushing strength through firing. Examples of articles made by this technique include fireclay pipes and funnels. The disadvantage of this technique is that it is relatively expensive since molds, patterns and extrusion presses are required which must resist a considerable pressure and because fireclay articles must be fired at a high temperature in order to guarantee sufficient crushing resistance and thermal stability. Further, they must be made with thick walls which results in a high weight of the finished article. Therefore, this technique has limited application.

German application AS No. 24 46 820, the disclosure of which is incorporated herein by reference, discloses a ceramic mass containing aluminum oxide and a phosphate binder which may be used as a compressed substance or a plastic mass. In order to make refractory molded articles from this ceramic mass, such as refractory bricks, temperatures of from 500° to 1650° C. are required.

Swiss Pat. No. 500 144, the disclosure of which is incorporated herein by reference, describes a process for the production of ceramic molded objects wherein a refractory ceramic material is prepared with primary, secondary or tertiary metal phosphates as binders. Such molding materials after mixing of the individual components is stamped into a mold without any kind of internal structural makeup.

It is an object of this invention to produce thin walled refractory molded articles by a less expensive process as a replacement for conventional fireclay articles.

It is a further object of this invention to produce such articles having high crushing resistance and thermal stability.

It is still a further object of this invention to provide a simplified hardening process for the production of such articles.

These and other objects are accomplished by the practice of this invention which, briefly, comprises applying a refractory filler and $Al(H_2PO_4)_3 \cdot xH_2O$ or polyphosphates as a binder to a single or multi-layered carrier material to form a single or multi-layered, thin-walled structure subsequently hardened on the carrier material. The hardening is preferably conducted at a temperature below 400° C. There is thus obtained a phosphate-bonded, thin-walled shaped article which is refractory temperatures above 1300° C.

It is preferred that the thickness of the wall of the shaped article be below 15 mm. and, even more preferably, below 10 mm.

According to one embodiment of this invention, the carrier material is coated while in a moldable state with the binder and the filler and is then shaped into a single or multi-layered structure and thereafter hardened. In accordance with another embodiment, the carrier material may be shaped into the desired article and then coated with the binder and filler by immersing the shaped carrier material therein.

The molded articles produced in accordance with this invention are useful as pipes, gates, funnels and casting molds for use in the casting industry and as insulating plates. More specifically, the process of this invention is suitable for the production of refractory pipes which may be used as replacements for chamotte pipes and which are useful for pouring steel castings; for high corrosion resistant pouring gates and whirl runners; as flexible pipes for casting systems; as hollow cores for casting molds; as precision casting molds with burn-out or melt-out patterns; and as insulating plates. The advantages of the molded articles produced in accordance with this invention are in their better resistance to temperature changes as compared to customary refractory articles and in their low heat absorption required for certain applications.

The flexible pipes referred to in the preceding paragraph are prepared by impregnating the supporting material with filler and with aluminum dihydrogen-phosphate solution, or with a finished ceramic adhesive compound, and thereafter drying the composite material in the mold. Insulating plates referred to in the preceding paragraph may be made by impregnating textile fabrics or papers glued together in one or several layers in accordance with this invention.

After the support material has been impregnated with the filler and binder, the molded article may be hardened at ambient temperature in air. After predrying in air, the molded article may be further hardened by heating in a furnace at temperatures between 150° C. and 400° C.

Refractory fillers and reactants which may be used in accordance with the practice of this invention include aluminum hydroxide, refractory clay and alumina. Other fillers may also be used such as, for example, zirconium, quartz powder, fireclay powder, etc.

In addition to the refractory filler and the aluminum dihydrogenphosphate or polyphosphate binder, the material used to coat the supporting material may contain granular or fibrous substances, such as chamotte, mullite chamotte, corundum, quartz glass, quartz sand, olivin, chromite, magnesite, zircon sand, talc, asbestos, soap stone, magnesia and/or forsterite.

The carrier material or supporting material may be thin, solid but permeable papers, so that the mineral binder may penetrate through the pores and thereby connect the individual layers of the paper. A textile material may also be used, such as surgical cloth material in which case the binder will penetrate between the meshes of the fabric resulting in particularly high strength properties in the end product. Flexible or stretchable fiber substances, such as textile hoses, knitted goods, braids or bandages may also be used to produce refractory molded articles. The gas permeability of the refractory end product may be adjusted by the use of fibrous carrier material. There may also be used loose textile tissues which are painted with the aluminum dihydrogenphosphate-alumina-adhesive and then sprinkled with granular refractory material. Such webs wound in their moist state around a supporting body may be brought into their final form with or without any additional adhesive.

There may also be used as supporting materials paper mache, plastic foils, foamed plastic, rolls of paper or cardboard, wax models or soluble materials made from salt, urea or plastic. The supporting material may be coated on either the inside or the outside or both.

As the binder materials used in the practice of this invention, one can use commercially available aluminum dihydrogenphosphate solutions.

In addition to the refractory filler, there may be included in the coating composition hollow pellets of alumina, hollow polystyrene insulating spheres, wood flour, textile wastes, etc. in order to achieve the desired porosity and gas permeability. By admixing with the coating composition, fine grained steel shot, the resultant molded article will have an increased heat conductivity.

The following examples illustrate the practice of this invention:

EXAMPLE 1

Paper is used as the carrier or supporting material in this example. It is impregnated with a mineral binder having the composition:

200 g. of very fine grained aluminum oxide (polishing grade)
37 g. of aluminum hydroxide
100 ml. of aluminum dihydrogenphosphate solution (concentration 50% solids)
50 ml. of water.

The paper impregnated with this composition is wrapped around a supporting mandrel. After achieving the desired wall thickness of about 10 mm., the rolled, moist pipes are pulled off of the supporting mandrel and are predried in air. After predrying, they are further cured by heating in a furnace at about 300° C. The pipes are hardened at this temperature, whereby the paper is largely degassed and carbonized under the influence of the acid binder. The resultant articles are pipes which are shock resistant in molten iron and are useful as heat protective pipes, for example for iron rods. They are highly refractory and unreactive. They are useful as carriers for heating coils. In this example, the alumina serves as a filler and as a reaction agent which improves the heat and fire resistant properties of the resultant article. The composition may be varied within wide limits. Basically, all alumina containing refractory substances may be used as the refractory filler in the practice of this invention since they will harden at low temperatures. The addition of aluminum hydroxide further improves the air drying characteristics of the composition.

EXAMPLE 2

This example illustrates the production of a pouring funnel for foundry mold made of molding sand. A thin layer of paper or textile fabric is placed onto a supporting body. Subsequently, the paper or textile fabric is painted over with alumina-aluminum dihydrogenphosphate binder and is sprinkled with granular calcined fireclay having a particle size of about 0.1 to 0.3 mm. After drying in air, or in a furnace, the coating procedure is repeated several times until the desired thickness is attained. Thereafter, the finished article is cured at a temperature between 150° and 400° C.

Any other kind of thin-walled, refractory molded article may be produced by this technique, such as pipes or shells for casting molds or cores. Granular calcined fireclay (chamotte) is preferably used as a filler in the coating material. As the coating material, there may also be used a slurry consisting of a binder, a filler and optionally a reaction agent. Further additives include saw dust or wood shavings or styrofoam pearls.

EXAMPLE 3

This example illustrates the inclusion of a reinforcing agent into the final article. Straight pipes, elbows, channels or funnels for feeding metal into a casting mold, etc., may be produced by including a preshaped reinforcement, such as wound up wire or wire mesh. The reinforcing material is repeatedly coated with refractory material or may be applied between layers of supporting material which is impregnated with filler and binder in accordance with the practice of this invention. The reinforced article is then cured as previously described.

What is claimed is:

1. A process for the production of a thin-walled phosphate-bonded molded article which is refractory at temperatures above 1300° C. which comprises applying once or repeatedly to a preshaped wire fabric or mesh a composition comprising a refractory filler and $Al(H_2PO_4)_3 \cdot H_2O$ or a polyphosphate as binder and thereafter curing said composition at a temperature below 400° C. on said preshaped wire fabric or mesh to provide a single or multi-layered, thin-walled structure, said preshaped wire fabric or mesh permanently remaining in the resultant molded article and serving as a reinforcing agent for said article.

2. A process as described in claim 1 wherein the thickness of the wall of said molded article is less than 15 mm.

3. A process as described in claim 1 wherein the thickness of the wall of said molded article is less than 10 mm.

4. A process as defined in claim 1 wherein said carrier material is coated by a single or repeated immersion into the binder and filler composition.

5. A process as defined in claim 1, wherein said preshaped wire fabric or mesh, said binder and said filler, is placed upon a supporting body prior to hardening, which supporting body may be left in the molded article or removed therefrom after hardening.

6. A process as defined in claim 1 wherein to said binder $Al(OH)_3$ or a refractory clay are added as reactants.

7. A process as defined in claim 1 wherein said filler includes refractory oxides or silicates such as quartz powder.

8. A process as defined in claim 1 wherein the binder and filler compound containing aluminum hydroxide, refractory clay or alumina is hardened at ambient temperature in the air.

9. A process as defined in claim 1, wherein the article is predried in air, and subsequently cured in a furnace at a temperature between 150° and 300° C.

10. A process as defined in claim 1 wherein said binder and filler compound includes alumina and wherein said aluminum dihydrogenphosphate solution is formed in situ by the addition of phosphoric acid.

11. A process as defined in claim 1 wherein said binder and filler compound contains talc, asbestos, soapstone, magnesia, chromite, olivin or forsterite.

12. A process as defined in claim 1 wherein the curing process is controlled by the addition of curing accelerators or inhibitors.

13. A process as defined in claim 1 wherein the curing of the molded article is accomplished below the sintering point of the filler.

* * * * *